April 2, 1968  TAKESHI OKU  3,376,473
AUTOMATIC ARC WELDERS
Filed July 19, 1965  3 Sheets-Sheet 1

INVENTOR
Takeshi Oku
BY Stevens, Davis, Miller & Mosher
ATTORNEYS

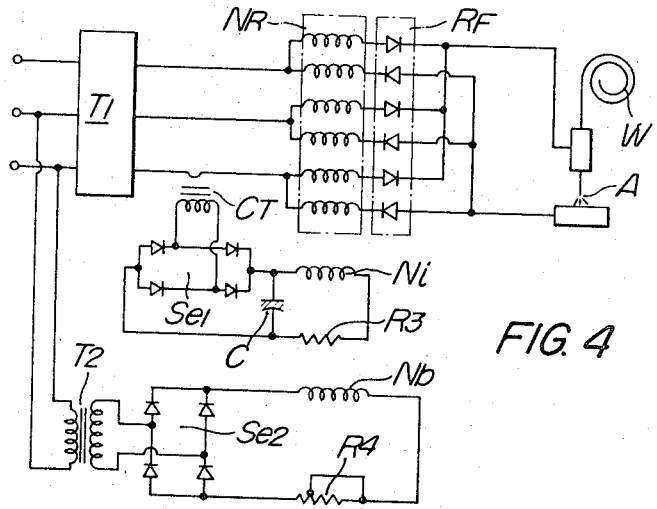
FIG. 4
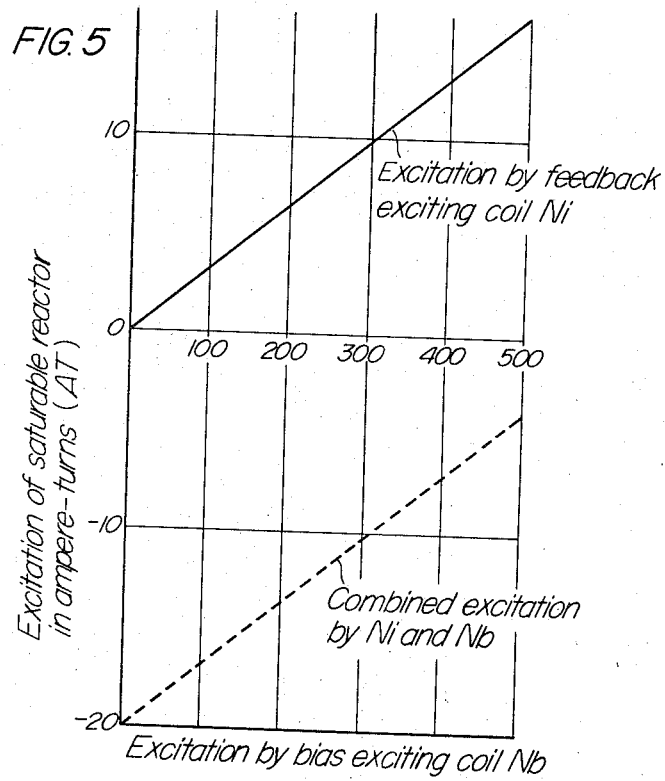

United States Patent Office 3,376,473
Patented Apr. 2, 1968

3,376,473
AUTOMATIC ARC WELDERS
Takeshi Oku, Suita-shi, Japan, assignor to Matsushita Electric Industrial Co., Ltd., Kadoma-shi, Osaka, Japan, a corporation of Japan
Filed July 19, 1965, Ser. No. 472,838
Claims priority, application Japan, July 23, 1964, 39/42,242
1 Claim. (Cl. 315—291)

ABSTRACT OF THE DISCLOSURE

An automatic arc welder including a power supply and a control device connected so as to provide an advanced or rising output characteristic conforming to the characteristics of the welding arc wherein the output voltage increases with a steady increase in the output arc current.

---

This invention relates to automatic arc welders of the type employing consumable electrodes.

Arc welders of this type, including those for $CO_2$ or other shield gas arc welding, generally employ a rectifier type power supply and control device with constant-voltage or more or less drooping output characteristics.

The present invention is intended to provide an automatic arc welder of the general type described including a power supply and control device with advanced or rising output characteristics, conforming to the characteristics of the welding arc.

The present invention will now be described with reference to the accompanying drawings, in which:

FIG. 4 is a circuit diagram of an automatic arc welder according to the present invention, including a rectifier type power supply and control device of rising characteristics;

FIG. 5 illustrates the excitation characteristic of the saturable reactor used in the power supply and control device in FIG. 4;

In the past, in automatic arc welding employing consumable electrodes and particularly in $CO_2$ and other shield gas arc welding processes, rectifier type power supply and control devices with constant-voltage characteristics have been used most widely. One form of automatic arc welder having such power supply and control device will first be described with reference to FIG. 1.

Figure 1:
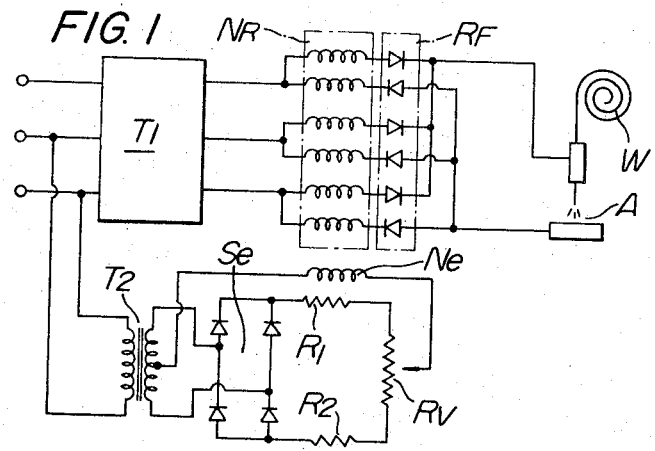
FIG. 1 is a circuit diagram of an automatic arc welder having a conventional rectifier type constant-voltage DC power supply and control device.

Referring to FIG. 1, reference character $T_1$ indicates a three-phase transformer; $N_R$ and $N_e$ indicate the reactor and exciting coils, respectively, of a saturable reactor; $R_F$ indicates rectifier elements; $T_2$ indicates a control transformer; $S_e$ indicates controlling rectifier elements; $R_1$ and $R_2$ indicate forward and reverse excitation limiting resistors; $R_V$ indicates a welding voltage regulator; W indicates a coil of welding wire; and A indicates the welding arc. The power supply and control device in the arc welder of this kind typically exhibits output characteristics as shown in FIG. 2, and in such device the output voltage is regulated by controlling the excitation of the saturable reactor used therein.

Figure 3:
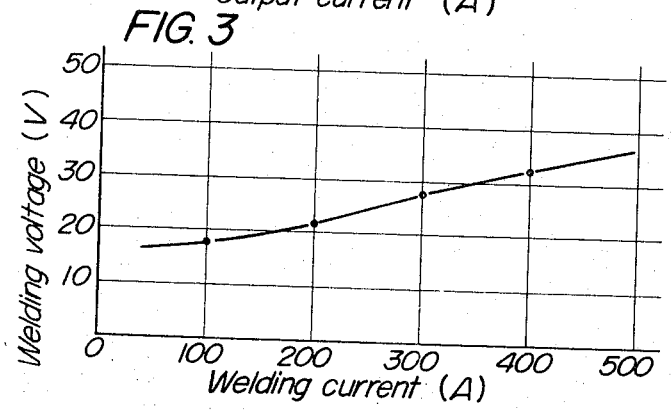
FIG. 3 illustrates optimum welding-voltage characteristics relative to the welding arc current.

On the other hand, the optimum voltage of the welding arc obtainable with such device exhibits a rising character with respect to the welding current, as illustrated in FIG. 3, which represents the current-voltage curve obtainable in case $CO_2$ is employed as a shielding gas. A generally similar curve is obtainable with arc welders of the type employing argon or other inert gas or the so-called submerged arc type.

Figure 2:
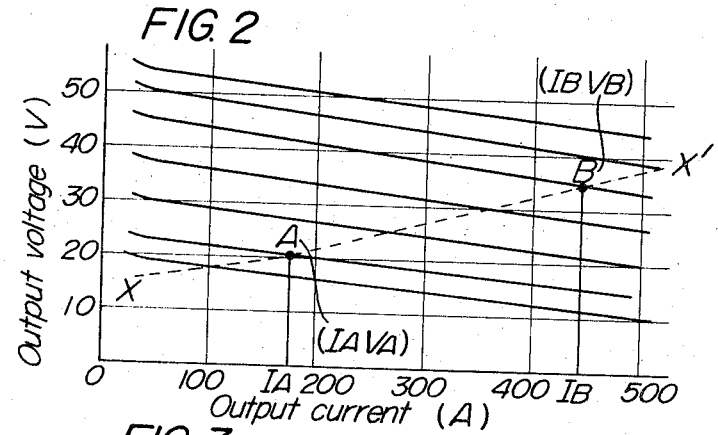
FIG. 2 illustrates the output characteristics of the power supply and control device of the arc welder shown in FIG 1.

With the power supply and control device of FIG. 1, which exhibit output characteristics as shown in FIG. 2, let it be assumed that welding is initially performed at point A, which represents a welding voltage $V_A$ and welding current $I_A$. Subsequently when it is desired to increase the welding current to $I_B$, the optimum voltage for the current $I_B$ must be $V_B$, assuming an optimum current-voltage curve X–X' which corresponds to the curve of FIG. 3. Accordingly, it is required to shift the operation point to B by re-adjusting the excitation of the power supply and control device. In practice, such controlling of the welding current and voltage has formed a troublesome problem, necessitating considerable skill on the part of the operator.

The present invention is designed to solve such problem previously involved in automatic arc welding and will next be described with reference to FIG. 4, which illustrates one embodiment of the invention.

In FIG. 4, reference characters $T_1$, $N_R$, $R_F$, W and A indicate respective parts corresponding to those indicated in FIG. 1 by the same reference characters. Reference character CT indicates a current transformer inserted in one phase of the output of the three-phase transformer $T_1$; $S_{e1}$ indicates auxiliary rectifier elements connected to the output of the current transformer CT; C indicates a capacitor connected across the output side of the rectifier circuit; $N_i$ indicates a feedback exciting coil connected to one terminal of the capacitor C and in series with a resistor $R_3$, which is connected to the other terminal of the capacitor; $T_2$ indicates an auxiliary transformer, to the output side of which auxiliary rectifier elements $S_{e2}$ are connected; and $N_b$ indicates a bias exciting coil connected to one of the output terminals of the rectifier circuit and in series with a bias resistor $R_4$, which is connected to the other output terminal of the rectifier.

In operation, a predetermined bias, usually of a negative value, is initially applied to the saturable reactor with an exciting current flowing through the bias exciting coil $N_b$.

Under this condition, without the provision of a feedback exciting coil $N_i$ and a controlling circuit therefor, the voltage absorbed by the reactor winding $N_R$ would be considerably high and the output would exhibit current-voltage characteristics as shown by solid lines in FIG. 2.

In contrast with this, with the circuit arrangement of FIG. 4, embodying the present invention, as the no-load state is changed to a loaded state forming a welding arc with increasing current, the alternating current proportional to the output current is transformed by the current transformer CT to a desired value and fullwave-rectified by the auxiliary rectifier elements $S_{e1}$, the rectified current being fed back to the feedback exciting coil $N_i$ through an accumulator circuit including capacitor C and resistor $R_3$. The feedback excitation should be opposite in polarity to the bias excitation effected by the bias exciting coil $N_b$. Thus, the respective excitations of the bias and feedback exciting coils $N_b$ and $N_i$ and their combined excitation are as illustrated in FIG. 5.

As will be seen from FIG. 5, the excitation of the saturable reactor increases with the output current, that is, has a negative value the absolute value of which decreases with increase of the output current, and the output current-voltage characteristic of the arc welder exhibits a rising character. Unlike ordinary resistor elements, the arc A has an apparent resistance value, i.e., a ratio of arc voltage to arc current which fluctuates to a substantial extent depending upon different factors including the current value and the arc length.

Figure 6:
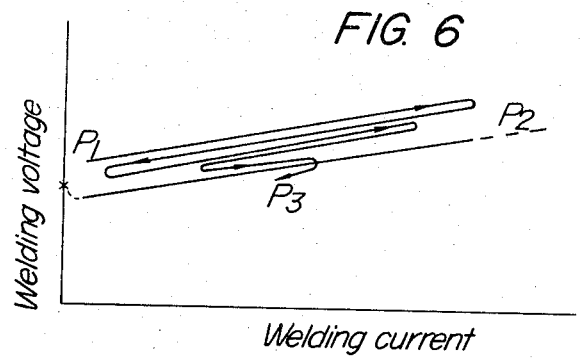
FIG. 6 illustrates the unstable arc formation.
Figure 7:
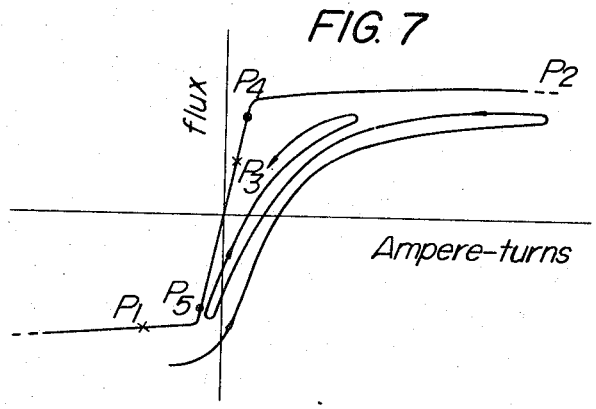
FIG. 7 illustrates how the saturable reactor is magnetized in the unstable arc condition.

In case the output current feedback circuit, including current transformer CT, auxiliary rectifier elements $S_{e1}$ and feedback exciting coil $N_i$, has no accumulator circuit such as including capacitor C and resistor $R_3$, the operating point cannot be stabilized because of the positive feedback of the feedback system. This causes repetition of alternate violent short-circuiting and arcing and no stable arc can be obtained. In detail, as illustrated in FIG. 6, the operating point is moved from point $P_1$ to point $P_2$ at the start of welding and subsequently oscillates as indicated by the arrowed line but does not proceed directly to the intended operating point $P_3$. The manner in which the cores of the saturable reactor are magnetized on this occasion is illustrated in FIG. 7. The state of magnetization of the reactor cores before the welding is started is represented by point $P_1$ and, as soon as the welding is started, the state of magnetization is shifted to point $P_2$ by the ampere-turns of the feedback excitation due to the welding current and then oscillates as indicated by the arrowed line in FIG. 7.

Though such phenomenon of oscillation is negligible where the load takes the form of an ordinary resistance, it is very remarkable with a welding arc involving short-circuiting, making it impossible to obtain any stable arc.

In contrast, an extremely stable arc can be obtained in the case where an accumulator circuit, for example, including a capacitor C and resistor $R_3$, is employed in the feedback circuit, as shown in FIG. 4. Namely, in this case, the welding current is initially shifted from point $P_1$ to point $P_2$ (FIG. 6) but the state of magnetization is not shifted directly to point $P_2$ in FIG. 7 but remains at $P_4$ close to point $P_3$.

Even in case the operating point is oscillated from point $P_2$ to point $P_5$, it passes through point $P_4$ to the point $P_3$ or its vicinity under the action of resistor $R_3$ and capacitor C so that the arc is stabilized in a moment. In this case, it is to be noted that the accumulator circuit, including capacitor C and resistor $R_3$, does not feed the feedback signal itself of the output current back to the feedback exciting coil $N_i$ but functions for energy accumulation upon reception of any instantaneous excessive signal and for release of the power accumulated upon reception of any following instantaneous excessively small signal so that a stabilized output can be obtained.

Figure 8:
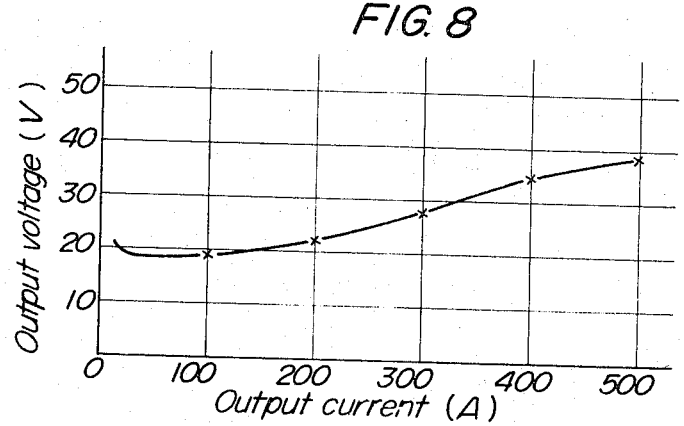
FIG. 8 illustrates the output characteristics of the arc welder embodying the present invention.

Experiments conducted with the arc welder of the present invention show that it exhibits desired output characteristics as illustrated in FIG. 8 and can form a welding arc which is extremely stable exhibiting no oscillation. The circuit constants of the arc welder used are as follows:

Current transformation ratio of current  
   transformer CT ------------------ 500/1.  
Capacitor C ------------------------ 2000 µf.  
Resistor $R_3$ ----------------------- 30 Ω.  
Bias due to bias exciting coil $N_b$ in  
   ampere-turns -------------------- −18 AT.  
Amount of feedback due to feedback  
   exciting coil $N_i$ ----------------- +3 AT./100 A.

It is to be noted that the following items can be freely controlled with the inventive arc welder:

(1) In case the voltage-current gradient of the output characteristic is varied, the amount of feedback can be varied by varying the current transformation ratio of current transformer CT, by varying the number of turns and polarity of the feedback exciting coil $N_i$, or by inserting a shunt resistor in parallel to the capacitor C.

(2) In case only the voltage is raised or lowered with a fixed gradient, the value of bias excitation can be varied by adjusting the resistor $R_4$ in FIG. 4 or by varying the number of turns of the bias excitation coil $N_b$.

In summation, the arc welder according to the present invention has among others the following advantages and thus is highly valuable in various industrial applications:

(1) Arc-stable rising output characteristics conforming to the arc characteristics can be obtained as desired with ease and economy.

(2) Any desired output characteristics can be easily obtained by adjusting the circuit constants.

(3) Adjustment of the welding conditions is very easy necessitating no particular skill since unlike any previous system an optimum voltage can be automatically obtained by simply varying the current output.

The invention is not restricted to the detailed features described above and shown in the drawings but may be varied in many ways within the scope of the appendant claim. For instance, though the accumulator circuit in the above embodiment includes a capacitor and a resistor, it may take the form of a combination of a capacitor and an inductive element, a resistor and an inductive element, or a capacitor, a resistor and an inductive element.

What is claimed is:

1. An automatic arc welder including a rectifier type power supply employing a consumable electrode for obtaining an output characteristic approximating the current voltage characteristic of the arc in which the output voltage increases with a steady increase of the output arc current, comprising a current transformer inserted in one of the main current conductors on the AC side of said power supply; a saturable reactor inserted in the AC main current conductors; said saturable reactor including a first exciting coil; feedback circuit means coupled to said current transformer providing output feedback current to said first exciting coil and positively exciting said saturable reactor; said feedback circuit means including rectifier means coupled to said control transformer, an accumulator circuit means comprising a capacitor coupled to said rectifier means, and a resistor coupling said accumulator circuit means to said first coil, for stabilizing feedback current in said feedback circuit whereby said output feedback current steadily increases with output current and is unaffected by instantaneous changes in output current; said saturable reactor including a second exciting coil, and a source of adjustable fixed bias exciting current applied to said second exciting coil providing reverse excitation of said saturable reactor.

References Cited
UNITED STATES PATENTS

| | | | |
|---|---|---|---|
| 2,634,394 | 4/1953 | Kohler | 321—25 |
| 2,798,571 | 7/1957 | Schaelchlin et al. | 321—25 |
| 2,994,027 | 7/1961 | Bennett et al. | 321—25 |

JAMES D. KALLAM, *Primary Examiner.*

JOHN W. HUCKERT, *Examiner.*

J. D. CRAIG, *Assistant Examiner.*